3,127,344
DRILLING FLUIDS CONTAINING METHYLOL PHENOL DERIVATIVES
Melvin De Groote, St. Louis, and Kwan-ting Shen, Brentwood, Mo., assignors to Petrolite Corporation, a corporation of Delaware
No Drawing. Original application May 12, 1960, Ser. No. 28,514. Divided and this application Apr. 11, 1961, Ser. No. 102,092
16 Claims. (Cl. 252—8.5)

This application is a division of our copending application Serial No. 28,514, filed May 12, 1960, which latter application is a continuation-in-part of our copending application Serial No. 730,510, filed April 24, 1958, now abandoned. See also our copending application Serial No. 804,088, filed April 6, 1959, now abandoned, which is a division of Serial No. 730,510. This invention relates to drilling fluids for wells containing (1) oxyalkylated, (2) acylated, (3) oxyalkylated then acylated, (4) acylated then oxyalkylated, and (5) acylated, then oxyalkylated and then acylated, monomeric polyaminomethyl phenols. These substituted phenols are produced by a process which is characterized by reacting a preformed methylol phenol (i.e., formed prior to the addition of the polyamine) with at least one mole of a secondary polyamine per equivalent of methylol group on the phenol, in the absence of an extraneous catalyst (in the case of an aqueous reaction mixture, the pH of the reaction mixture being determined solely by the methylol phenol and the secondary polyamine), until about one mole of water per equivalent of methylol group is removed; and then reacting this product with (1) an oxyalkylating agent, (2) an acylating agent, (3) an oxyalkylating agent then an acylating agent, (4) an acylating agent then an oxyalkylating agent or (5) an acylating agent then an oxyalkylating agent and then an acylating agent.

The reasons for the unexpected monomeric form and properties of the polyaminomethyl phenol are not understood. However, we have discovered that when (1) A preformed methylolphenol (i.e., formed prior to the addition of the polyamine) employed as a starting material is reacted with
(2) A polyamine which contains at least one secondary amino group
(3) In amounts of at least one mole of secondary polyamine per equivalent of methylol group on the phenol,
(4) In the absence of an extraneous catalyst, until
(5) About one mole of water per equivalent of methylol group is removed, then a monomeric polyaminomethyl phenol is produced which is capable of being oxyalkylated, acylated, oxyalkylated then acylated, or acylated then oxyalkylated, or acylated, then oxyalkylated and then acylated to provide the superior product employed in the compositions of this invention. All of the above five conditions are critical for the production of these monomeric polyaminomethyl phenols.

In contrast, if the methylol phenol is not preformed but is formed in the presence of the polyamine, or the preformed methylol phenol is condensed with the polyamine in the presence of an extraneous catalyst, either acidic or basic, for example, basic or alkaline materials such as $NaOH$, $Ca(OH)_2$, $Na_2CO_3$, sodium methylate, etc., a polymeric product is formed. Thus, if an alkali metal phenate is employed in place of the free phenol, or even if a lesser quantity of alkali metal is present than is required to form the phenate, a polymeric product is formed. Where a polyamine containing only primary amino groups and no secondary amino groups is reacted with a methylol phenol, a polymeric product is also produced. Similarly, where less than one mole of secondary amine is reacted per equivalent of methylol group, a polymeric product is also formed.

In general, the monomeric polyaminomethyl phenols are prepared by condensing the methylol phenol with the secondary amine as disclosed above, said condensation being conducted at a temperature sufficiently high to eliminate water but below the pyrolytic point of the reactants and product, for example, at 80° to 200° C., but preferably at 100° to 150° C. During the course of the condensation water can be removed by any suitable means, for example, by use of an azeotroping agent, reduced pressure, combinations thereof, etc. Measuring the water given off during the reaction is a convenient method of judging completion of the reaction.

The classes of methylol phenols employed in the condensation are as follows:

*Monophenols.*—A phenol containing 1, 2 or 3 methylol groups in the ortho or para position (i.e., the 2, 4, 6 positions), the remaining positions on the ring containing hydrogen or groups which do not interfere with the polyamine-methylol group condensation, for example, alkyl, alkenyl, cycloalkyl, phenyl, halogen, and alkoxy, etc., groups, and having but one nuclear linked hydroxyl group.

*Diphenols.*—One type is a diphenol containing two hydroxybenzene radicals directly joined together through the ortho or para (i.e., 2, 4, or 6) position with a bond joining the carbon of one ring with the carbon of the other ring, each hydroxybenzene radical containing 1 to 2 methylol groups in the 2, 4 or 6 positions, the remaining positions on each ring containing hydrogen or groups which do not interfere with the polyamine-methylol group condensation, for example, alkyl, alkenyl, cycloalkyl, phenyl, halogen, alkoxy, etc., groups, and having but two nuclear linked hydroxyl groups.

A second type is a diphenol containing two hydroxybenzene radicals joined together through the ortho or para (i.e., 2, 4, or 6 position) with a bridge joining the carbon of one ring to a carbon of the other ring, said bridge being, for example, alkylene, alkylidene, oxygen, carbonyl, sulfur, sulfoxide and sulfone, etc., each hydroxybenzene radical containing 1 to 2 methylol groups in the 2, 4, or 6 positions, the remaining positions on each ring containing hydrogen or groups which do not interfere with the polyaminomethylol group condensation, for example alkyl, alkenyl, cycloalkyl, phenyl, halogen, alkoxy, etc., groups, and having but two nuclear linked hydroxyl groups.

The secondary polyamines employed in producing the condensate are illustrated by the following general formula:

where at least one of the R's contains an amino group and the R's contain alkyl, alkoxy, cycloalkyl, aryl, aralkyl, alkaryl radicals, and the corresponding radicals containing heterocyclic radicals, hydroxy radicals, etc. The R's may also be joined together to form heterocyclic polyamines. The preferred classes of polyamines are the alkylene polyamines, the hydroxylated alkylene polyamines, branched polyamines containing at least three primary amino groups, and polyamines containing cyclic amidine groups. The only limitation is that there shall be present in the polyamine at least one secondary amino group which is not bonded directly to a negative radical which reduces the basicity of the amine, such as a phenyl group.

An unusual feature of the products employed in the compositions of the present invention is the discovery that methylol phenols react more readily under the herein specified conditions with secondary amino groups than with primary amino groups. Thus, where both primary and secondary amino groups are present in the same molecule, reaction occurs more readily with the secondary amino group. However, where the polyamine contains only primary amino groups, the product formed under reaction conditions as mentioned above is an insoluble resin. In contrast, where the same number of primary amino groups are present on the amine in addition to at least one secondary amino group, reaction occurs predominantly with the secondary amino group to form non-resinous derivatives. Thus, where trimethylol phenol is reacted with ethylene diamine, an insoluble resinous composition is produced. However, where diethylene triamine, a compound having just as many primary amino groups as ethylene diamine, is reacted, according to this invention a non-resinous product is unexpectedly formed.

The term "monomeric" as employed in the specification and claims refers to a polyaminomethylphenol containing within the molecular unit one aromatic unit corresponding to the aromatic unit derived from the starting methylol phenol and one polyamine unit for each methylol group originally in the phenol. This is in contrast to a polymeric or resinous polyaminomethyl phenol containing within the molecular unit more than one aromatic unit and/or more than one polyamino unit for each methylol group.

The monomeric products produced by the condensation of the methylol phenol and the secondary amine may be illustrated by the following "idealized" formula:

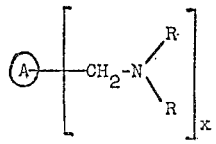

where A is the aromatic unit corresponding to that of the methylol reactant, and the remainder of the molecule is the polyaminomethyl radical, one for each of the original methylol groups.

This condensation reaction may be followed by oxyalkylation in the conventional manner, for example, by means of an alpha-beta alkylene oxide such as ethylene oxide, propylene oxide, butylene oxide, octylene oxide, a higher alkylene oxide, styrene oxide, glycide, methylglycide, etc., or combinations thereof. Depending on the particular application desired, one may combine a large proportion of alkylene oxide, particularly ethylene oxide, propylene oxide, a combination or alternate additions or propylene oxide and ethylene oxide, or smaller proportions thereof in relation to the methylol phenol-amine condensation product. Thus, the molar ratio of alkylene oxide to amine condensate can range within wide limits, for example, from a 1:1 molt ratio to a ratio of 1000:1, or higher, but preferably 1 to 200. By proper control, desired hydrophilic or hydrophobic properties are imparted to the composition. As is well known, oxyalkylation reactions are conducted under a wide variety of conditions, at low or high pressures, at low or high temperatures, in the presence or absence of catalyst, solvent, etc. For instance oxyalkylation reactions can be carried out at temperatures of from 80–200° C., and pressures of from 10 to 200 p.s.i., and times of from 15 min. to several days. Preferably oxyalkylation reactions are carried out at 80 to 120° C. and 10 to 30 p.s.i. For conditions of oxyalkylation reactions see U.S. Patent 2,792,369 and other patents mentioned therein.

As in the amine condensation, acylation is conducted at a temperature sufficiently high to eliminate water and below the pyrolytic point of the reactions and the reaction products. In general, the reaction is carried out at a temperature of from 140° to 280° C., but preferably at 140° to 200° C. In acylating, one should control the reaction so that the phenolic hydroxyls are not acylated. Because acyl halides and anhydrides are capable of reacting with phenolic hydroxyls, this type of acylation should be avoided. It should be realized that either oxyalkylation or acylation can be employed alone or each alternately, either one preceding the other. In addition, the amine condensate can be acylated, then oxyalkylated and then reacylated. The amount of acylation agent reacted will depend on reactive groups or the compounds and properties desired in the final product, for example, the molar ratios of acylation agent to amine condensate can range from 1 to 15, or higher, but preferably 1 to 4.

Where the above amine condensates are treated with alkylene oxides, the product formed will depend on many factors, for example, whether the amine employed is hydroxylated, etc. When the amines employed are non-hydroxylated, the amine condensate is at least susceptible to oxyalkylation through the phenolic hydroxyl radical. Although the polyamine is non-hydroxylated, it may have one or more primary or secondary amino groups which may be oxyalkylated, for example, in the case of tetraethylene pentamine. Such groups may or may not be susceptible to oxyalkylation for reasons which are obscure. Where the non-hydroxylated amine contains a plurality of secondary amino groups, wherein one or more is susceptible to oxyalkylation, or primary amino groups, oxyalkylation may occur in those positions. Thus, in the case of the non-hydroxylated polyamines oxyalkylation may take place not only at the phenolic hydroxyl group but also at one or more of the available amino groups. Where the amine condensate is hydroxyalkylated, this latter group furnishes an additional position of oxyalkylation susceptibility.

The product formed in acylation will vary with the particular polyaminomethyl phenol employed. It may be an ester or an amide depending on the available reactive groups. If, however, after forming the amide at a temperature between 140°–250° C., but usually not above 200° C., one heats such products at a higher range, approximately 250–280° C., or higher, possibly up to 300° C. for a suitable period of time, for example, 1–2 hours or longer, one can in many cases recover a second mole of water for each mole of carboxylic acid employed, the first mole of water being evolved during amidification. The product formed in such cases is believed to contain a cyclic amidine ring such as an imidazoline or a tetrahydropyrimidine ring.

Ordinarily the methods employed for the production of amino imidazolines result in the formation of substantial amounts of other products such as amido imidazolines. However, certain procedures are well known by which the yield of amino imidazolines is comparatively high as, for example, by the use of a polyamine in which one of the terminal hydrogen atoms has been replaced by a low molal alkyl group or an hydroxyalkyl group, and by the use of salts in which the polyamine has been converted into a monosalt such as combination with hydrochloric acid or paratoluene sulfonic acid. Other procedures involve reaction with a hydroxyalkyl ethylene diamine and further treatment of such imidazoline having a hydroxyalkyl substituent with two or more moles of ethylene imine. Other well known procedures may be employed to give comparatively high yields.

Other very useful derivatives comprise acid salts and quaternary salts, derived therefrom. Since the compositions contain basic nitrogen groups, they are capable of reacting with inorganic acids, for example hydrohalogens (HCl, HBr, HI), sulfuric acid, phosphoric acid, etc., aliphatic acids (acetic, propionic, glycolic, diglycolic, etc.), aromatic acids (benzoic, salicylic, phthalic, etc.), and organic compounds capable of forming salts, for example, those having the general formula RX wherein R is an organic group, such as an alkyl group (e.g., methyl, ethyl, propyl, butyl, octyl, nonyl, decyl, undecyl, dodecyl, tridecyl, pentadecyl, oleyl, octadecyl, etc.), cycloalkyl (e.g., cyclopentyl, cyclohexyl, etc.), aralkyl (e.g., benzyl, etc.), aralkyl (e.g., benzyl, etc.), and the like, and X is a radical capable of forming a salt such as those derived from acids (e.g., halide, sulfate, phosphate, sulfonate, etc., radicals). The preparation of these salts and quarternary compounds is well known to the chemical art. For example, they may be prepared by adding suitable acids (for example, any of those mentioned herein as acylating agents) to solutions of the basic composition or by heating such compounds as alkyl halides with these compositions. Diacid and quaternary salts can also be formed by reacting alkylene dihalides, polyacids, etc. The number of moles of acid and quaternary compounds that may react with the composition of this invention will, of course, depend on the number of basic nitrogen groups in the molecule. These salts may be represented by the general formula N+X−, wherein N comprises the part of the compound containing the nitrogen group which has been rendered positively charged by the H or R of the alkylating compound and X represents the anion derived from the alkylating compound.

THE METHYLOL PHENOL

As previously stated, the methylol phenols include monophenols and diphenols. The methylol groups on the phenol are either in or two ortho positions or in the para position of the phenolic rings. The remaining phenolic ring positions are either unsubstituted or substituted with groups not interfering with the amine methylol condensation. Thus, the monophenols have 1, 2 or 3 methylol groups and the diphenols contain 1, 2, 3 or 4 methylol groups.

The following is the monophenol most advantageously employed:

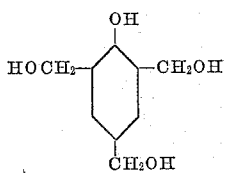

This compound, 2,4,6 trimethylol phenol (TMP) is available commercially in 70% aqueous solutions. The designation TMP is sometimes used to designate trimethylol propane. Apparently no confusion is involved, in light of the obvious differences.

A second monophenol which can be advantageously employed is:

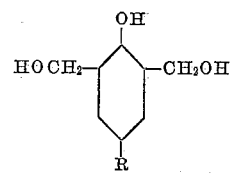

where R is an aliphatic saturated or unsaturated hydrocarbon having, for example, 1–30 carbon atoms, for example, methyl, ethyl, propyl, butyl, sec-butyl, tert-butyl, amyl, tert-amyl, hexyl, tert-hexyl, octyl, nonyl, decyl, dodecyl, octo-decyl, etc., the corresponding unsaturated groups, etc.

The third monophenol advantageously employed is:

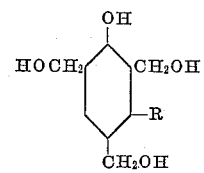

where R comprises an aliphatic saturated or unsaturated hydrocarbon as stated above in the second monophenol, for example, that derived from cardanol or hydrocardanol.

The following are diphenol species advantageously employed:
One species is

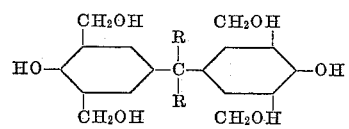

where R is hydrogen or a lower alkyl, preferably methyl.

A second species is

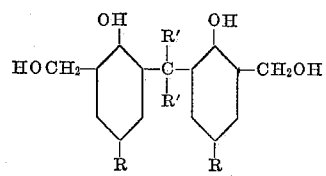

where R has the same meaning as that of the second species of the monophenols and R′ is hydrogen or a lower alkyl, preferably methyl.

We can employ a wide variety of methylol phenols in the reaction, and the reaction appears to be generally applicable to the classes of phenols heretofore specified. Examples of suitable methylol phenols include:
Monophenols:

2-methylol phenol
    2,6-dimethylol, 4-methyl phenol
    2,4,6-trimethylol phenol
    2,6-dimethylol, 4-cyclohexyl phenol
    2,6-dimethylol-4-phenyl phenol
    2,6-dimethylol-4-methoxyphenol
    2,6-dimethylol-4-chlorophenol
    2,6-dimethylol-3-methylphenol
    2,6-dimethylol-4-sec-butylphenol
    2,6-dimethylol,3,5-dimethyl-4-chlorophenol
    2,4,6-trimethylol,3-pentadecyl phenol
    2,4,6-trimethylol,3-pentadecadienyl phenol Diphenols:

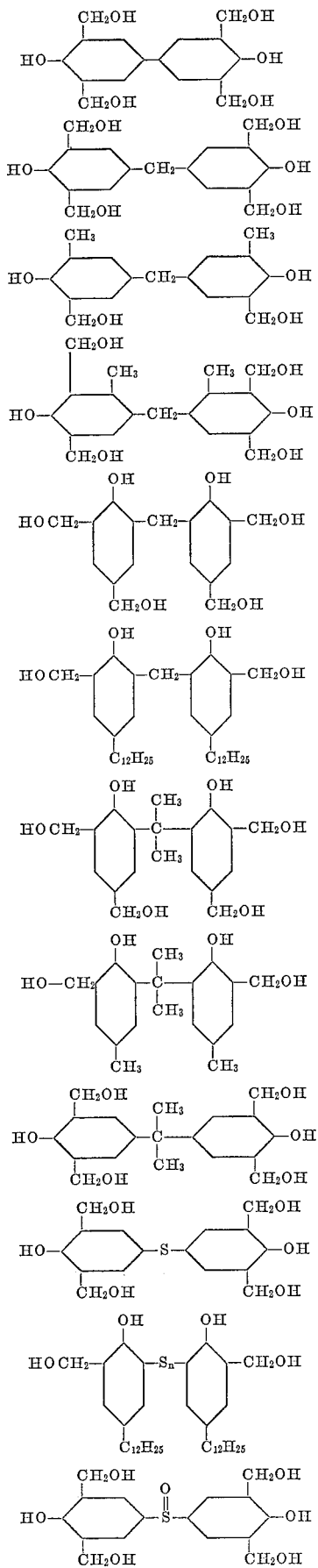

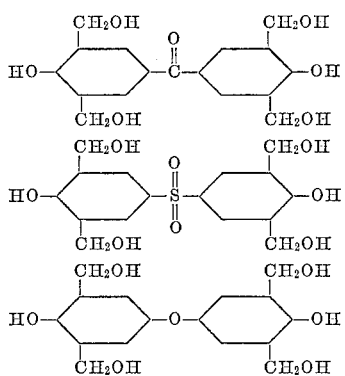

Examples of additional methylol phenols which can be employed to give the useful products of this invention are described in "The Chemistry of Phenolic Resins," by Robert W. Martin, Tables V and VI, pp. 32–39 (Wiley, 1956).

THE POLYAMINE

As noted previously, the general formula for the polyamine is

This indicates that a wide variety of reactive secondary polyamines can be employed, including aliphatic polyamines, cycloaliphatic polyamines, aromatic polyamines (provided the aromatic polyamine has at least one secondary amine which has no negative group, such as a phenyl group directly bonded thereto) heterocyclic polyamines and polyamines containing mixtures of the above groups. Thus, the term "polyamine" includes compounds having one amino group on one kind of radical, for example, an aliphatic radical, and another amino group on the heterocyclic radical as in the case of the following formula:

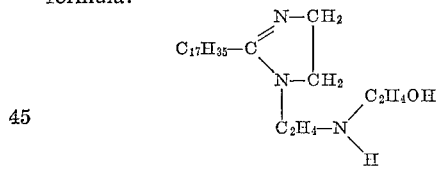

provided, of course, the polyamine has at least one secondary amino group capable of condensing with the methylol group. It also includes compounds which are totally heterocyclic, having a similarly reactive secondary amino group. It also includes polyamines having other elements besides carbon, hydrogen and nitrogen, for example, those also containing oxygen, sulfur, etc. As previously stated, the preferred embodiments of the present invention are the alkylene polyamines, the hydroxylated alkylene polyamines and the amino cyclic amidines.

Polyamines are available commercially and can be prepared by well-known methods. It is well known that olefin dichlorides, particularly those containing from 2 to 10 carbon atoms, can be reacted with ammonia or amines to give alkylene polyamines. If, instead of using ethylene dichloride, the corresponding propylene, butylene, amylene or higher molecular weight dichlorides are used, one then obtains the comparable homologues. One can also use alpha-omega dialkyl ethers such as

and the like. Such polyamines can be alkylated in the manner commonly employed for alkylating monoamines. Such alkylation results in products which are symmetrically or non-symmetrically alkylated. The symmetrically alkylated polyamines are most readily obtainable. For instance, alkylated products can be derived by reaction between alkyl chlorides, such as propyl chloride, butyl chloride, amyl chloride, cetyl chloride, and the like and a polyamine having one or more primary amino groups. Such reactions result in the formation of hydrochloric acid, and hence the resultant product is an amine hydrochloride. The conventional method for conversion into the base is to treat with dilute caustic solution. Alkylation is not limited to the introduction of an alkyl group, but as a matter of fact, the radical introduced can be characterized by a carbon atom chain interrupted at least once by an oxygen atom. In other words, alkylation is accomplished by compounds which are essentially alkyoxyalkyl chlorides, as, for example, the following:

$$CH_3OC_2H_4Cl \qquad C_2H_5OC_2H_4Cl$$
$$C_2H_5OC_3H_6Cl \qquad C_6H_{13}OC_6H_{12}Cl$$

The reaction involving the alkylene dichlorides is not limited to ammonia, but also involves amines, such as ethylamine, propylamine, butylamine, octylamine, decylamine, cetylamine, dodecylamine, etc. Cycloaliphatic and aromatic amines are also reactive. Similarly, the reaction also involves the comparable secondary amines, in which various alkyl radicals previously mentioned appear twice and are types in which two dissimilar radicals appear, for instance, amyl butylamine, hexyl octylamine, etc. Furthermore, compounds derived by reactions involving alkylene dichlorides and a mixture of ammonia and amines, or a mixture of two different amines are useful. However, one need not employ a polyamine having an alkyl radical. For instance, any suitable polyalkylene polyamine, such as an ethylene polyamine, a propylene polyamine, etc., treated with ethylene oxide or similar oxyalkylating agent are useful. Furthermore, various hydroxylated amines, such as monoethanolamine, monopropanolamine, and the like, are also treated with a suitable alkylene dichloride, such as ethylene dichloride, propylene dichloride, etc.

As to the introduction of a hydroxylated group, one can use any one of a number of well-known procedures such as alkylation, involving a chlorhydrin, such as ethylene chlorhydrin, glycerol chlorhydrin, or the like. Such reactions are entirely comparable to the alkylation reaction involving alkyl chlorides previously described. Other reactions involve the use of an alkylene oxide, such as ethylene oxide, propylene oxide, butylene oxide, octylene oxide, styrene oxide or the like. Glycide is advantageously employed. The type of reaction just referred to is well known and results in the introduction of a hydroxylated or polyhydroxylated radical in an amino hydrogen position. It is also possible to introduce a hydroxylated oxyhydrocarbon atom; for instance, instead of using the chlorhydrin corresponding to ethylene glycol, one employs the chlorhydrin corresponding to diethylene glycol. Similarly, instead of using the chlorhydrin corresponding to glycerol, one employs the chlorhydrin corresponding to diglycerol.

From the above description it can be seen that many of the above polyamines can be characterized by the general formula

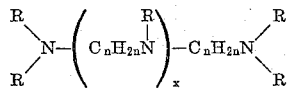

where the R's, which are the same or different, comprise hydrogen, alkyl, cycloalkyl, aryl, alkyloxyalkyl, hydroxylated alkyl, hydroxylated alkyloxyalkyl, etc., radicals, $x$ is zero or a whole number of at least one, for example 1 to 10, but preferably 1 to 3, provided the polyamine contains at least one secondary amino group, and $n$ is a whole number, 2 or greater, for example 2–10, but preferably 2–5. Of course, it should be realized that the amino or hydroxyl group may be modified by acylation to form amides, esters or mixtures thereof, prior to the methylol-amino condensation provided at least one active secondary amine group remains on the molecule. Any of the suitable acylating agents herein described may be employed in this acylation. Prior acylation of the amine can advantageously be used instead of acylation subsequent to amine condensation.

A particularly useful class of polyamines is a class of branched polyamines. These branched polyamines are polyalkylene polyamines wherein the branched group is a side chain containing on the average at least one nitrogen-bonded aminoalkylene

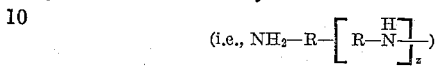

group per nine amino units present on the main chain, for example 1–4 of such branched chains per nine units on the main chain, but preferably one side chain unit per nine main chain units. Thus, these polyamines contain at least three primary amino groups and at least one tertiary amino group in addition to at least one secondary amino group.

These branched polyamines may be expressed by the formula

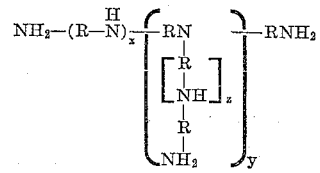

wherein R is an alkylene group such as ethylene, propylene, butylene and other homologues (both straight chained and branched), etc., but preferably ethylene; and $x$, $y$ and $z$ are integers, $x$ being for example, from 4 to 24 or more but preferably 6 to 18, $y$ being for example 1 to 6 or more but preferably 1 to 3, and $z$ being for example 0–6 but preferably 0–1. The $x$ and $y$ units may be sequential, alternative, orderly or randomly distributed.

The preferred class of branched polyamines includes those of the formula

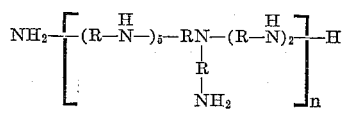

where $n$ is an integer, for example 1–20 or more but preferably 1–3, wherein R is preferably ethylene, but may be propylene, butylene, etc. (straight chained or branched).

The particularly preferred branched polyamines are presented by the following formula:

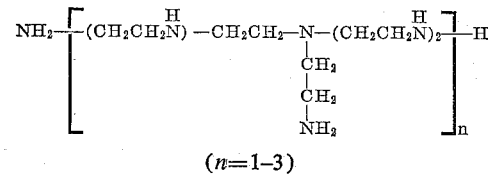

$$(n=1-3)$$

The radicals in the brackets may be joined in a head-to-head or a head-to-tail fashion. Compounds described by this formula wherein $n=1-3$ are manufactured and sold by Dow Chemical Company as Polyamines N–400, N–800, N–1200, etc. Polyamine N–400 has the above formula wherein $n=1$ and was the branched polyamine employed in all of the specific examples.

The branched polyamines can be prepared by a wide variety of methods. One method comprises the reaction of ethanolamine and ammonia under pressure over a fixed bed of a metal hydrogenation catalyst. By controlling the conditions of this reaction one can obtain various amounts of piperazine and polyamines as well as the branched chain polyalkylene polyamine. This process is described in Australian Patent No. 42,189 and in the East German Patent 14,480 (March 17, 1958) reported in Chem. Abstracts, August 10, 1958, 14129.

The branched polyamines can also be prepared by the following reactions:

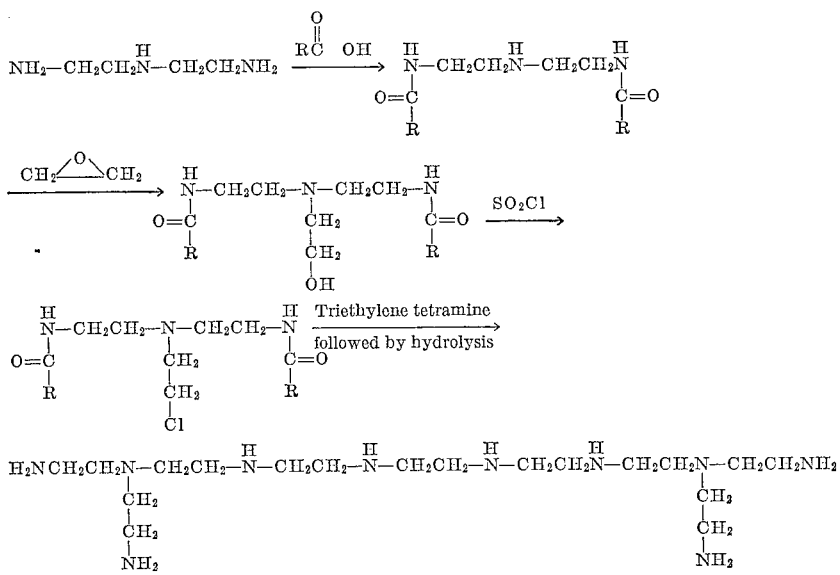

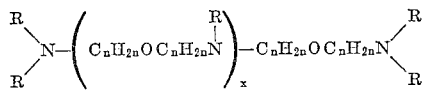

Variations on the above procedure can produce other branched polyamines.

The branched nature of the polyamine imparts unusual properties to the polyamine and its derivatives. Cyclic aliphatic polyamines having at least one secondary amino group such as piperazine, etc., can also be employed.

It should be understood that diamines containing a secondary amino group may be employed. Thus, where $x$ in the linear polyalkylene amine is equal to zero, at least one of the R's would have to be hydrogen, for example, a compound of the following formula:

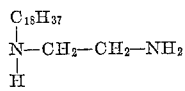

Suitable polyamines also include polyamines wherein the alkylene group or groups are interrupted by an oxygen radical, for example,

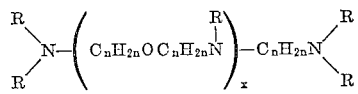

or mixtures of these groups and alkylene groups, for example,

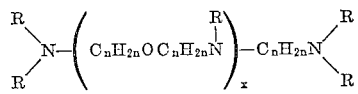

where R, $n$ and $x$ has the meaning previously stated for the linear polyamine.

For convenience the aliphatic polyamines have been classified as nonhydroxylated and hydroxylated alkylene polyamino amines. The following are representative members of the nonhydroxylated series:

Diethylene triamine,
Dipropylene triamine,
Dibutylene triamine, etc.
Triethylene tetramine,
Tripropylene tetramine,
Tributylene tetramine, etc.,
Tetraethylene pentamine,
Tetrapropylene pentamine,
Tetrabutylene pentamine, etc.,
Mixtures of the above,
Mixed ethylene, propylene, and/or butylene, etc., polyamines and other members of the series.

The above polyamines modified with higher molecular weight aliphatic groups, for example, those having from 8–30 or more carbon atoms, a typical example of which is

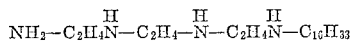

where the aliphatic group is derived from any suitable source, for example, from compounds of animal or vegetable origin, such as coconut oil, tallow, tall oil, soya, etc., are very useful. In addition, the polyamine can contain other alkylene groups, fewer amino groups, additional higher aliphatic groups, etc., provided the polyamine has at least one reactive secondary amino group. Compositions of this type are described in U.S. Patent 2,267,205.

Other useful aliphatic polyamines are those containing substitued groups on the chain, for example, aromatic groups, heterocylic groups, etc., such as a compound of the formula

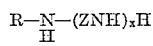

where R is alkyl and Z is an alkylene group containing phenyl groups on some of the alkylene radicals since the phenyl group is not attached directly to the secondary amino group.

In adidtion, the alkylene group substituted with a hydroxy group

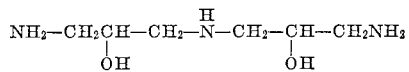

is reactive.

Polyamines containing aromatic groups in the main part of the chain are useful, for example, N,N'-dimethyl-p-xylylenediamine.

Examples of polyamines containing solely secondary amino groups include the following:

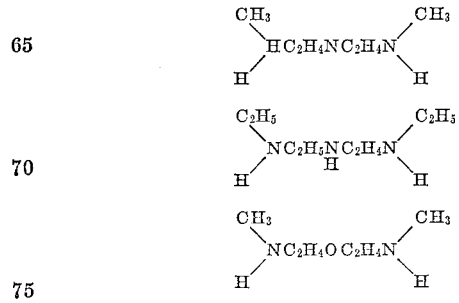

separating trap condenser, heating mantle, etc. 70% aqueous 2,4,6 trimethylol phenol which can be prepared by conventional procedures or purchased in the open market, in this instance, the latter, is employed. The amount used is one gram mole, i.e., 182 grams, of anhydrous trimethylol phenol in 82 grams of water. This represents three equivalents of methylol groups. This solution is added dropwise with stirring to three gram moles (309 grams) of diethylene triamine dissolved in 100 ml. of xylene over about 30 minutes. An exothermic reaction takes place at this point but the temperature is maintained below approximately 60° C. The temperature is then raised so that distillation takes place with the removal of the predetermined amount of water, i.e., the water of solution as well as water of reaction. The water of reaction represents 3 gram moles or 54 grams.

The entire procedure including the initial addition of the trimethylol phenol until the end of the reaction is approximately 6 hours. At the end of the reaction period the xylene is removed, using a vacuum of approximately 80 mm. The resulting product is a viscous water-soluble liquid of a dark red color.

*Example 28a*

This example illustrates the reaction of a methylolmonophenol and a branched polyamine. A one liter flask is employed equipped with a conventional stirring device, thermometer, phase separating trap, condenser, heating mantle, etc. Polyamine N–400, 200 grams (0.50 mole), is placed in the flask and mixed with 150 grams of xylene. To this stirred mixture is added dropwise over a period of 15 minutes 44.0 grams (0.17 mole) of a 70% aqueous solution of 2,4,6-trimethylol phenol. There is no apparent temperature change. The reaction mixture is then heated to 140° C., refluxed 45 minutes, and 24 milliliters of water is collected (the calculated amount of water is 22 milliliters). The product is a dark brown liquid (as a 68% xylene solution).

*Example 2d*

This example illustrates the reaction of a methylol diphenol.

One mole of substantially water-free

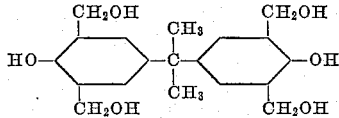

and 4 moles of triethylenetetramine in 300 ml. of xylene are mixed with stirring. Although an exothermic reaction takes place during the mixing, the temperature is maintained below 60° C. The reaction mixture is then heated and azeotroped until the calculated amount (72 g.) of water is removed (4 moles of water of reaction). The maximum temperature is 150° C. and the total reaction time is 8 hours. Xylene is then removed under vacuum. The product is a viscous water-soluble liquid.

*Example 5b*

In this example, 1 mole of substantially water-free

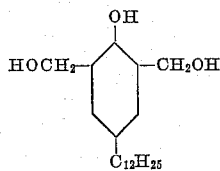

is reacted with 2 moles of Duomeen S (Armour Co.),

where R is a fatty group derived from soya oil, in the manner of Example 2a. Xylene is used as both solvent and azeotroping agent. The reaction time is 8 hours and the maximum temperature 150–160° C.

*Example 28b*

This experiment is carried out in the same equipment as is employed in Example 28a except that a 300 milliliter flask is used. Into the flask is placed 50 grams of xylene and 8.4 grams (0.05 mole) of 2,6-dimethylol-4-methylphenol are added. The resulting slurry is stirred and warmed up to 80° C. Polyamine N–400, 40.0 grams (0.10 mole) is added slowly over a period of 45 minutes. Solution takes place upon the addition of the polyamine. The reaction mixture is refluxed for about 4 hours at 140° C. and 1.8 milliliters of water is collected, the calculated amount. The product, as a xylene solution, is a brown liquid.

*Example 29b*

This experiment is carried out in the same equipment and in the same manner as is employed in Example 28b. To a slurry of 10.5 grams (0.05 mole) of 2,6-dimethylol-4-tertiarybutylphenol in 50 grams of xylene, 40 grams (0.10 mole) of Polyamine N–400 are added all at once with stirring and the mixture is heated and refluxed at 140° C. for 4 hours with the collection of 1.6 milliliters of water. The calculated amount of water is 1.8 milliliters. The product, as a xylene solution, is reddish brown.

*Example 30b*

This experiment is carried out in the same equipment and in the same manner as is employed in Example 28b. To a slurry of 14.0 grams of 2,6-dimethylol-4-nonylphenol in 50 milliliters of benzene, 40.0 grams (0.10 mole) of Polyamine N–400 are added all at once with stirring and the mixture is heated and refluxed at 140° C. for 6 hours with the collection of 1.8 milliliters of water. The calculated amount of water is 1.8 milliliters. The product, as a xylene solution, is dark brown.

The following amino-methylol condensates shown in Tables I–IV are prepared in the manner of Examples 1a, 2d, and 5b. In each case one mole of polyamine per equivalent of methylol group on the phenol is reacted and the reaction carried out until, taking into consideration the water originally present, about one mole of water is removed for each equivalent of methylol group present on the phenol.

The pH of the reaction mixture is determined solely by the reactants (i.e., no inorganic base, such as $Ca(OH)_2$, NaOH, etc. or other extraneous catalyst is present). Examples 1a, 2d, and 5b are also shown in the tables. Attempts are made in the examples to employ commercially available materials where possible.

In the following tables the examples will be numbered by a method which will describe the nature of the product. The polyamine-methylol condensate will have a basic number, for example, 1a, 4b, 6c, 4d, wherein those in the A series are derived from TMP, the B series from DMP, the C series from trimethylol cardanol and side chain hydrogenated cardanol (i.e., hydrocardanol), and the d series from the tetramethylol diphenols. The basic number always refers to the same amino condensate. The symbol A before the basic number indicates that the polyamine had been acylated prior to condensation. The symbol A after the basic number indicates that acylation takes place after condensation.

A25a means that the 25a (amino condensate) was prepared from an amine which had been acylated prior to condensation. However, 10aA means that the condensate was acylated after condensation. The symbol O indicates oxyalkylation. Thus 10aAO indicates that the amine condensate 10a has been acylated (10aA), followed by oxyalkylation. 10aAOA means that the same condensate, 10a, has been acylated (10aA), then oxyalkylated (10aAO) and then acylated. In other words, these symbols indicate both kind and order of treatment.

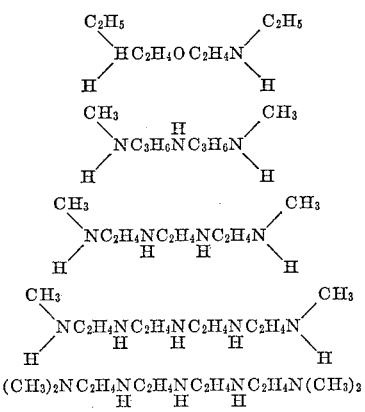

Examples of polyamines having hydroxylated groups include the following:

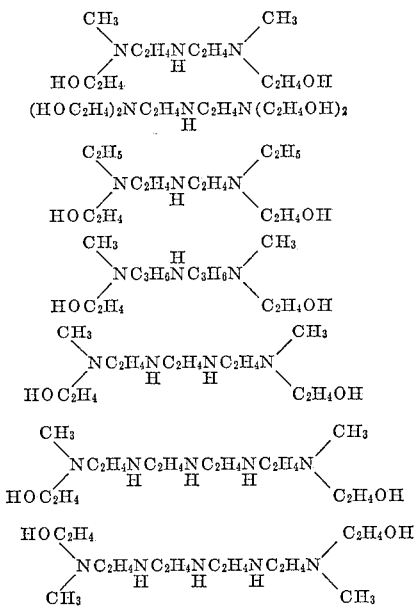

Suitable cyclic amidines include

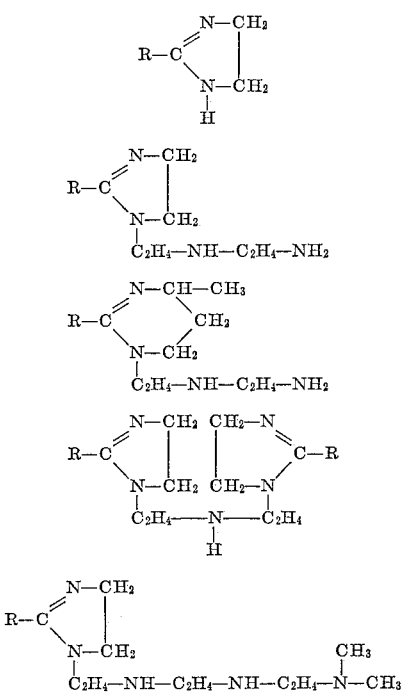

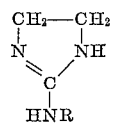

wherein R is a hydrocarbon group,

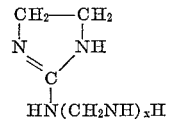

where $x = 1-5$.

2-undecylimidazoline
2-heptadecylimidazoline
2-oleylimidazoline
1-N-decylaminoethyl, 2-ethylimidazoline
2-methyl, 1-hexadecylaminoethylaminoethylimidazoline
1-dodecylaminopropylimidazoline
1-(stearoyloxyethyl)aminoethylimidazoline
1-stearamidoethylaminoethylimidazoline
2-heptadecyl, 4-5-dimethylimidazoline
1-dodecylaminohexylimidazoline
1-stearoyloxyethylaminohexylimidazoline
2-heptadecyl, 1-methylaminoethyl tetrahydropyrimidine
4-methyl, 2-dodecyl, 1-methylaminoethylaminoethyl tetrahydropyrimidine

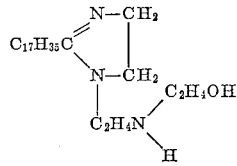

As previously stated, there must be reacted at least one mole of polyamine per equivalent of methylol group. The upper limit to the amount of amine present will be determined by convenience and economics, for example, 1 or more moles of polyamine per equivalent of methylol group can be employed.

The following examples are illustrative of the preparation of the polyaminomethylol phenol condensate and are not intended for purposes of limitation.

The following general procedure is employed in preparing the polyamine-methylol condensate. The methylolphenol is generally mixed or slowly added to the polyamine in ratios of 1 mole of polyamine per equivalent of methylol group on the phenol. However, where the polyamine is added to the methylolphenol, addition is carried out below 60° C. until at least one mole of polyamine per methylol group has been added. Enough of a suitable azeotroping agent is then added to remove water (benzene, toluene, or xylene) and heat applied. After removal of the calculated amount of water from the reaction mixture (one mole of water per equivalent of methylol group) heating is stopped and the azeotroping agent is evaporated off under vacuum. Although the reaction takes place at room temperature, higher temperatures are required to complete the reaction. Thus, the temperature during the reaction generally varies from 80-160° C. and the time from 4-24 hours. In general, the reaction can be effected in the lower time range employing higher temperatures. However, the time test of completion of reaction is the amount of water removed.

*Example 1a*

This example illustrates the reaction of a methylolmonophenol and a polyamine. A liter flask is employed with a conventional stirring device, thermometer phase

TABLE I

Reaction of

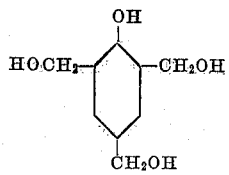

(designated TMP) and polyamines.

[Molar ratio TMP to amine 1:3]

| Example | Polyamine |
|---|---|
| 1a | Diethylene triamine. |
| 2a | Triethylene tetramine. |
| 3a | Tetraethylene pentamine. |
| 4a | Dipropylene triamine. |
| 5a | Duomeen S (Armour Co.)  R—N(H)—CH₂CH₂CH₂NH₂ (R derived from soya oil) |
| 6a | Duomeen T (Armour Co.)  R—N(H)—CH₂CH₂CH₂NH₂ (R derived from tallow) |
| 7a | Oxyethylated Duomeen S  R—N(H)—CH₂CH₂CH₂N(C₂H₄OH)(H) |
| 8a | Oxyethylated Duomeen T  R—N(H)—CH₂CH₂CH₂N(C₂H₄OH)(H) |
| 9a | Amine ODT (Monsanto)  C₁₂H₂₅—N(H)—C₂H₄N(H)—C₂H₄NH₂ |
| 10a | Oxyethylated Amine ODT  C₁₂H₂₅—N(H)—C₂H₄N(H)—C₂H₄N(C₂H₄OH)(H) |
| 11a | N-(2-hydroxyethyl)-2-methyl-1,2-propanediamine. |
| 12a | N-methyl ethylene diamine. |
| 13a | N,N'-dimethyl ethylene diamine. |
| 14a | Hydroxyethyl ethylene diamine. |
| 15a | N,N'-dihydroxyethylethylene diamine. |
| 16a | N-methyl propylene diamine. |
| 17a | N,N'-dihydroxyethyl propylene diamine. |
| 18a | N,N'-dihydroxypropyl propylene diamine. |
| 19a | HOC₂H₄—N(H)C₂H₄O—C₂H₄O—C₂H₄N(C₂H₄OH)(H) |
| 20a | C₁₇H₃₃C(=N—CH₂)(N(H)—CH₂) (imidazoline) |
| 21a | CH₃C(=N—CH₂)(N—CH₂)—C₂H₄—N(H)—C₂H₄N(H)—C₁₆H₃₃ |
| 22a | C₁₇H₃₅—C(=N—CH₂)(N—CH₂)(CH₂)(CH₃); C₂H₄N(H) |
| 23a | C₁₇H₃₅—C(=N—CH₂)(N—CH₂); C₂H₄OH / C₂H₄N(H) |
| 24a | C₄H₉C(=N—CH₂)(N(H)—CH₂) |
| A25a | Oleic acid prior acylated triethylene tetramine (1:1 molar ratio). |
| A26a | Stearic acid prior acylated tetraethylene pentamine (1:1 molar ratio). |
| A27a | Lauric acid prior acylated tetraethylene pentamine (1:1 molar ratio). |
| 28a | Polyamine N-400. |

The products formed in the above Table I are dark, viscous liquids.

TABLE II

Reaction of

HOCH₂—⌬(OH)—CH₂OH  with R substituent (designated DMP) with polyamines.

[Molar ratio DMP/amine 1:2]

| Example | R | Polyamine |
|---|---|---|
| 1b | Dodecyl | Diethylene triamine. |
| 2b | Octadecyl | Triethylene tetramine. |
| 3b | Sec-butyl | Tetraethylene pentamine. |
| 4b | Dodecyl | Dipropylene triamine. |
| 5b | do | Duomeen S (Armour Co.)  R—N(H)—CH₂CH₂CH₂NH₂ (R derived from soya oil) |
| 6b | Octadecyl | Duomeen T (Armour Co.)  R—N(H)—CH₂CH₂CH₂NH₂ (R derived from tallow) |
| 7b | Mixed sec and tertbutyl. | Oxyethylated Duomeen S  R—N(H)—CH₂CH₂CH₂N(C₂H₄OH)(H) |
| 8b | Dodecyl | Oxyethylated Duomeen T  R—N(H)—CH₂CH₂CH₂N(C₂H₄)(H) |
| 9b | Tert-butyl | Amine ODT (Monsanto)  C₁₂H₂₅—N(H)—C₂H₄N(H)—C₂H₄NH₂ |
| 10b | do | Oxyethylated amine ODT  C₁₂H₂₅—N(H)—C₂H₄N(H)—C₂H₄N(C₂H₄OH)(H) |
| 11b | Octadecyl | N-(2-hydroxyethyl)-2-methyl-1,2 propanediamine. |
| 12b | Dodecyl | N-methyl ethylene diamine. |
| 13b | do | N,N'-dimethyl ethylene diamine. |
| 14b | do | Hydroxyethyl ethylene diamine. |
| 15b | do | N,N'-dihydroxyethylethylene diamine. |
| 16b | do | N-methyl propylene diamine. |
| 17b | Octadecyl | N,N'-dihydroxyethyl propylene diamine. |
| 18b | do | N,N'-dihydroxypropyl propylene diamine. |

TABLE II—Continued

| Example | R | Polyamine |
|---|---|---|
| 19b | Tert butyl | $HOC_2H_4-NC_2H_4O-C_2H_4O-C_2H_4-N(C_2H_4OH)(H)$, with NH |
| 20b | ...do... | $C_{17}H_{33}C$ with ring N-CH$_2$, N-CH$_2$, NH |
| 21b | ...do... | $CH_3C$ with ring N-CH$_2$, N-CH$_2$, N-C$_2$H$_4$-NH-C$_2$H$_4$N-C$_{16}$H$_{33}$-H |
| 22b | ...do... | $C_{17}H_{35}-C$ with ring N-CH$_2$, CH$_2$, N-CH$_2$; C$_2$H$_4$N(CH$_3$)(H) |
| 23b | ...do... | $C_{17}H_{35}-C$ with ring N-CH$_2$, N-CH$_2$; C$_2$H$_4$N(C$_2$H$_4$OH)(H) |
| 24b | Dodecyl | $C_4H_9C$ with ring N-CH$_2$, N-CH$_2$, NH |
| A25b | ...do... | Oleic acid prior acylated triethylene tetramine (1:1 molar ratio). |
| A-26b | ...do... | Stearic acid prior acylated tetraethylene pentamine (1:1 molar ratio). |
| A27b | ...do... | Lauric acid prior acylated tetraethylene pentamine (1:1 molar ratio). |
| 28b | Methyl | Polyamine N-400. |
| 29b | Tert butyl | Do. |
| 30b | Nonyl | Do. |

The products formed in the above Table II are dark viscous liquids.

TABLE III

Reaction of $HOCH_2$—[phenol ring with OH, CH$_2$OH, R', CH$_2$OH]

(trimethylol cardanol and side chain hydrogenated cardanol) with polyamines.

[Molar ratio of the trimethylol cardanol to amine 1:3]

| Example | R' Derived from— | Polyamine |
|---|---|---|
| 1c | Cardanol | Diethylene triamine. |
| 2c | ...do... | Triethylene tetramine. |
| 3c | Hydrogenated Cardanol. | Tetraethylene pentamine. |
| 4c | ...do... | Dipropylene triamine. |
| 5c | ...do... | Duomeen S (Armour Co.) $R-N(H)-CH_2CH_2CH_2NH_2$ (R derived from soya oil) |
| 6c | ...do... | Duomeen T (Armour Co.) $R-N(H)-CH_2CH_2CH_2NH_2$ (R derived from tallow) |
| 7c | Cardanol | Oxyethylated Duomeen S $R-N(H)-CH_2CH_2CH_2N(C_2H_4OH)(H)$ |
| 8c | Hydrogenated Cardanol. | Oxyethylated Duomeen T $R-N(H)-CH_2CH_2CH_2N(C_2H_4OH)(H)$ |
| 9c | Cardanol | Amine ODT (Monsanto) $C_{12}H_{25}-N(H)-C_2H_4N(H)-C_2H_4NH_2$ |
| 10c | Hydrogenated Cardanol. | Oxyethylated Amine ODT $C_{12}H_{25}-N(H)-C_2H_4N(H)-C_2H_4N(C_2H_4OH)(H)$ |
| 11c | Cardanol | N-(2-hydroxyethyl)-2-methyl-1,2-propanediamine. |
| 12c | Hydrogenated Cardanol. | N-methyl ethylene diamine. |

The products formed in the above Table III are dark, viscous liquids.

TABLE IV

Reaction of

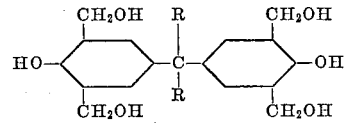

[Molar ratio of tetramethylol diphenol to polyamine 1:4]

| Example | R | Polyamine |
|---|---|---|
| 1d | Hydrogen | Diethylene triamine. |
| 2d | ...do... | Triethylene tetramine. |
| 3d | ...do... | Tetraethylene pentamine. |
| 4d | ...do... | Dipropylene triamine. |
| 5d | ...do... | Duomeen S (Armour Co.) $R-N(H)-CH_2CH_2CH_2NH_2$ (R derived from soya oil) |
| 6d | ...do... | Duomeen T (Armour Co.) $R-N(H)-CH_2CH_2CH_2NH_2$ (R derived from tallow) |
| 7d | ...do... | Oxyethylated Duomeen S $R-N(H)-CH_2CH_2CH_2N(C_2H_4OH)(H)$ |
| 8d | ...do... | Oxyethylated Duomeen T $R-N(H)-CH_2CH_2CH_2N(C_2H_4OH)(H)$ |
| 9d | ...do... | Amine ODT (Monsanto) $C_{12}H_{25}-N(H)-C_2H_4N(H)-C_2H_4NH_2$ |
| 10d | ...do... | Oxyethylated Amine ODT $C_{12}H_{25}-N(H)-C_2H_4N(H)-C_2H_4N(C_2H_4OH)(H)$ |
| 11d | ...do... | N-(2-hydroxyethyl)-2-methyl-1,2 propanediamine. |
| 12d | ...do... | N-methyl ethylene diamine. |
| 13d | Methyl | Diethylene triamine. |
| 14d | ...do... | Triethylene tetramine. |
| 15d | ...do... | Tetraethylene pentamine. |
| 16d | ...do... | Dipropylene triamine. |

TABLE IV—Continued

| Example | R | Polyamine |
|---|---|---|
| 17d | Methyl | Duomeen S (Armour Co.)<br>$$R-\overset{H}{\underset{}{N}}-CH_2CH_2CH_2NH_2$$<br>(R derived from soya oil) |
| 18d | ___do___ | Duomeen T (Armour Co.)<br>$$R-\overset{H}{\underset{}{N}}-CH_2CH_2CH_2NH_2$$<br>(R derived from tallow) |
| 19d | ___do___ | Oxyethylated Duomeen S<br>$$R-\overset{H}{\underset{}{N}}-CH_2CH_2CH_2N\overset{C_2H_4OH}{\underset{H}{\diagdown}}$$ |
| 20d | ___do___ | Oxyethylated Duomeen T<br>$$R-\overset{H}{\underset{}{N}}-CH_2CH_2CH_2N\overset{C_2H_4OH}{\underset{H}{\diagdown}}$$ |
| 21d | ___do___ | Amine ODT (Monsanto)<br>$$C_{12}H_{25}-\overset{H}{\underset{H}{N}}-C_2H_4N-C_2H_4NH_2$$ |
| 22d | ___do___ | Oxyethylated Amine ODT<br>$$C_{12}H_{25}-\overset{H}{\underset{H}{N}}-C_2H_4N-C_2H_4N\overset{C_2H_4OH}{\underset{H}{\diagdown}}$$ |
| 23d | ___do___ | N-(2-hydroxyethyl)-2-methyl-1,2-propanediamine. |
| 24d | ___do___ | N-methyl ethylene diamine. |

The products formed in the above Table IV are dark, viscous liquids.

THE ACYLATING AGENT

As in the reaction between the methylol phenol and the secondary amine, acylation is also carried out under dehydrating conditions, i.e., water is removed. Any of the well-known methods of acylation can be employed. For example, heat alone, heat and reduced pressure, heat in combination with an azeotroping agent, etc., are all satisfactory.

A wide variety of acylating agents can be employed. However, strong acylating agents such as acyl halides, or acid anhydrides should be avoided since they are capable of esterifying phenolic hydroxy groups, a feature which is undesirable.

Although a wide variety of carboxylic acids produce excellent products, in our experience monocarboxy acids having more than 6 carbon atoms and less than 40 carbon atoms give most advantageous products. The most common examples include the detergent forming acids, i.e., those acids which combine with alkalies to produce soap or soap-like bodies. The detergent-forming acids, in turn, include naturally-occurring fatty acids, resin acids, such as abietic acid, naturally occurring petroleum acids, such as naphthenic acids, and carboxy acids, produced by the oxidation of petroleum. As will be subsequently indicated, there are other acids which have somewhat similar characteristics and are derived from somewhat different sources and are different in structure, but can be included in the broad generic term previously indicated.

Suitable acids include straight chain and branched chain, saturated and unsaturated, aliphatic, alicyclic, fatty, aromatic, hydroaromatic, and aralkyl acids, etc.

Examples of saturated aliphatic monocarboxylic acids are acetic, propionic, butyric, valeric, caproic, heptanoic, caprylic, nonanoic, capric, undecanoic, lauric, tridecanoic, myristic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids are acrylic, methacrylic, crotonic, angelic, tiglic, the pentenoic acids, the hexenoid acids, for example, hydrosorbic acid, the heptenoic acids, the octenoic aicds, the nonenoic acids, the decenoic acids, for example, obtusilic acid, the undecenoic acids, the dodecenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetracosenoic acids, and the like.

Examples of dienoic acids are the pentadienoic acids, the hexadienoic acids, for example, sorbic acid, the octadienoic acids, for example, linoleic, and the like.

Examples of the trienoic acids are the octadecatrienoic acids, for example, linolenic acid, eleostearic acid, pseudo-eleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelardic acid, hydroxyoctadecenoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids are ricinoleyl lactic acid, acetyl ricinoleic acid, chloroacetyl ricinoleic acid, and the like.

Examples of the cyclic aliphatic carboxylic acids are those found in petroleum called naphthenic acids, hydrocarpic and chaulmoogric acids, cyclopentane carboxylic and cyclohexanecarboxylic acid, campholic acid, fencholic acids, and the like.

Examples of aromatic monocarboxylic acids are benzoic acid, substituted benzoic acids, for example, the toluic acids, the xylenic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soya-bean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polyacrboxylic acids are fumaric, maleic, mesacenic, citraconic, glutaconic, itaconic, muconic, aconitic acids, and the lie.

Examples of aromatic polycarboxylic acids are phthalic, isophthalic acids, terephthalic acids, substituted derivatives thereof (e.g., alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups are hemimellitic, trimellitic, trimesic, mellophanic, prehnitic, pyromellitic acids, mellitic acid, and the like.

Other polycarboxylic acids are the dimeric, trimeric and polymeric acids, for example, dilinoleic trilinoleic, and other polyacids sold by Emery Industries, and the like. Other polycarboxylic acids include those containing ether groups, for example, diglycolic acid. Mixtures of the above acids can be advantageously employed.

In addition, acid precursors such as esters, glycerides, etc. can be employed in place of the free acid.

The moles of acylating agent reacted with the polyaminomethyl compound will depend on the number of acetylation reactive positions contained therein as well as the number of moles one wishes to incorporate into the molecule. We have advantageously reacted 1 to 15 moles of acylating agent per mole of polyaminophenol, but preferably 3 to 6 moles.

The following examples are illustrative of the preparation of the acylated polyaminomethyl phenol condensate.

The following general procedure is employed in acylating. The condensate is mixed with the desired ratio of acid and a suitable azeotroping agent is added. Heat is then applied. After the removal of the calculated amount of water (1 to 2 equivalents per mole of acid employed), heating is stopped and the azeotroping agent is evaporated under vacuum. The temperature during the reaction can vary from 80°–200° C. (except where the formation of the cyclic amidine type structure is desired and the maximum temperature is generally 200–280° C.). The times range from 4 to 24 hours. Here again, the true test of the degree of reaction is the amount of water removed.

*Example 3aA*

In a 5 liter, 3 necked flask furnished with a stirring device, thermometer, phase separating trap, condenser and heating mantle, 697 grams of 3a (one mole of the TMP-tetraethylene pentamine reaction product) is dissolved in 600 ml. of xylene. 846 grams of oleic acid (3 moles) is added to the TMP-polyamine condensate with stirring in ten minutes. The reaction mixture was then heated gradually to about 145° in half an hour and then held at about 160° over a period of 3 hours until 54 grams (3 moles) of water is collected in the side of the tube. The solvent is then removed with gentle heating under a reduced pressure of approximately 20 mm. The product is a dark brown viscous liquid with a nitrogen content of 14.5%.

*Example 3aA'*

The prior example is repeated except that the final reaction temperature is maintained at 240° C. and 90 grams (5 moles) of water is removed instead of 54 grams. Infrared analysis of the product indicates the presence of a cyclic amidine ring.

*Example 7aA*

The reaction product of Example 7a (TMP and oxyethylated Duomeen S) is reacted with palmitic acid in the manner of Example 3aA. A xylene soluble product is formed.

The following examples of acylated polyaminomethyl phenol condensates are prepared in the manner of the above examples. The products obtained are dark viscous liquids.

*Example 28aA*

Into a 300 milliliter flask, fitted with a stirring device, thermometer, phase separating trap, condenser and heating mantle, is placed a xylene solution of the product of Example 28a containing 98.0 grams (0.05 mole) of the reaction product of 2,4,6-trimethylolphenol and Polyamine N–400 and about 24 grams of xylene. To this solution is added with stirring 30.0 grams (0.15 mole) of lauric acid. The reaction mixture is heated for about one hour at a maximum reaction temperature of 190° C. and 6 milliliters of water are collected. The calculated amount of water for imidazoline formation is 5.4 milliliters. The resulting product as an 88 percent xylene solution is a dark brown thick liquid.

*Example 28bA*

Into a 300 milliliter flask, fitted with a stirring device, thermometer, phase separating trap, condenser and heating mantle is placed a xylene solution of the product of Example 28b containing 35.0 grams (0.025 mole) of the reaction product of 2,6-dimethylol-4-methylphenol and Polyamine N–400 and about 20 grams of xylene. To this solution is added with stirring 14.1 grams (0.05 mole) of oleic acid. The reaction mixture is heated at reflux for 4.5 hours at a maximum temperature of 183° C. and 1.0 milliliters of water is collected, the calculated amount of water for amide formation being 0.9 milliliter. The produce is a dark burgundy liquid (as 70.5% xylene solution).

*Example 29bA*

This experiment is performed in the same equipment and in the same manner as employed in Example 28bA. Into the flask is placed a xylene solution of the product of Example 29b containing 40.9 grams (0.025 mole) of the reaction product of 2,6-dimethyl-4-tertiarybutyl phenol and Polyamine N–400 and about 47 grams of xylene. To this solution is added with stirring 7.2 grams (0.05 mole) of octanoic acid. The reaction mixture is heated at reflux for 3.75 hours at a maximum temperature of 154° C. and 1.3 milliliters of water is collected. The calculated amount of water for amide formation is 0.9 milliliter. The product as a 49.82 percent xylene solution was brown.

*Example 30bA*

This experiment is performed in the same manner and in the same equipment as is employed in Example 28bA. Into the flask is placed a xylene solution of the product of Example 30b containing 39.6 grams (0.025 mole) of the reaction product of 2,6-dimethylol-4-nonylphenol and Polyamine N–400 and about 32 grams of xylene. To this solution is added with stirring 14.2 grams (0.05 mole) of stearic acid. The reaction mixture is heated at reflux for 4 hours at a maximum temperature of 160° C. and 1.0 milliliter of water is collected. The calculated amount of water for amide formation is 0.9 milliliter. The product as a 62.5% xylene solution is a brown liquid.

TABLE V.—ACYLATED PRODUCTS OF TABLE I

| Example | Acid | Grams of acid per gram-moles of condensate | Grams of water removed |
|---|---|---|---|
| 1aA | Oleic | 846 | 54 |
| 2aA | Nonanoic | 316 | 36 |
| 3aA | Oleic | 846 | 54 |
| 3aA' | do | 846 | 90 |
| 4aA | Stearic | 852 | 54 |
| 5aA | Lauric | 600 | 54 |
| 6aA | Myristic | 684 | 54 |
| 7aA | Palmitic | 768 | 54 |
| 8aA | Propanoic | 222 | 54 |
| 9aA | Dimeric [1] | 1,800 | 54 |
| 10aA | Oleic | 846 | 54 |
| 11aA | do | 846 | 54 |
| 12aA | Sunaptic acid [2] | 990 | 54 |
| 14aA | Oleic | 846 | 54 |
| 15aA | Palmitic | 1,536 | 108 |
| 16aA | Oleic | 846 | 54 |
| 17aA | do | 1,692 | 108 |
| 18aA | do | 1,692 | 108 |
| 19aA | do | 846 | 54 |
| 23aA | Acetic | 180 | 54 |
| 28aA | Lauric | 600 | 120 |

[1] Dilinoleic acid sold by Emery Industries. Also employed in examples of Tables VI, VII and VIII.
[2] Naphthenic acid sold by Sun Oil Company, average molecular weight 220–230.

TABLE VI.—ACYLATED PRODUCTS OF TABLE II

| Example | Acid | Grams of acid per gram-mole of condensate | Grams of water removed |
|---|---|---|---|
| 1bA | Stearic | 568 | 36 |
| 2bA | Oleic | 564 | 36 |
| 3bA | Lauric | 800 | 72 |
| 4bA | Acetic | 120 | 36 |
| 5bA | Myristic | 456 | 36 |
| 6bA | Palmitic | 512 | 36 |
| 7bA | Dimeric [1] | 1,200 | 36 |
| 8bA | Oleic | 564 | 36 |
| 9bA | ---do--- | 564 | 36 |
| 10bA | Sunaptic acid [2] | 660 | 36 |
| 11bA | Oleic | 564 | 36 |
| 12bA | ---do--- | 564 | 36 |
| 14bA | Palmitic | 512 | 36 |
| 15bA | Acetic | 240 | 72 |
| 16bA | Oleic | 564 | 36 |
| 17bA | ---do--- | 1,128 | 72 |
| 18bA | ---do--- | 564 | 36 |
| 19bA | ---do--- | 564 | 36 |
| 23bA | Lauric | 400 | 36 |
| 28bA | Oleic | 564 | 40 |
| 29bA | Octanoic | 288 | 52 |
| 30bA | Stearic | 569 | 40 |

[1][2] See footnotes at bottom of Table V.

TABLE VII.—ACYLATED PRODUCTS OF TABLE III

| Example | Acid | Grams of acid used per gram-mole of condensate | Grams of water removed |
|---|---|---|---|
| 1cA | Oleic | 564 | 36 |
| 2cA | Palmitic | 512 | 36 |
| 3cA | Lauric | 800 | 72 |
| 4cA | Myristic | 456 | 36 |
| 5cA | Acetic | 120 | 36 |
| 6cA | Dimeric [1] | 1,200 | 36 |
| 7cA | Oleic | 564 | 36 |
| 8cA | ---do--- | 564 | 36 |
| 9cA | Sunaptic [2] | 660 | 36 |
| 10cA | Oleic | 564 | 36 |
| 11cA | ---do--- | 564 | 36 |
| 12cA | ---do--- | 564 | 36 |

[1][2] See footnotes at bottom of Table V.

TABLE VIII.—ACYLATED PRODUCTS OF TABLE IV

| Example | Acid | Grams of acid used per gram-mole of condensate | Grams of water removed |
|---|---|---|---|
| 1dA | Oleic | 1,128 | 72 |
| 2dA | ---do--- | 1,128 | 72 |
| 3dA | Stearic | 2,272 | 144 |
| 4dA | Lauric | 800 | 72 |
| 5dA | Myristic | 912 | 72 |
| 6dA | Palmitic | 1,024 | 72 |
| 7dA | Oleic | 1,128 | 72 |
| 8dA | Dimeric [1] | 2,400 | 72 |
| 9dA | Sunaptic [2] | 1,320 | 72 |
| 10dA | Acetic | 240 | 72 |
| 11dA | Oleic | 1,128 | 72 |
| 12dA | ---do--- | 1,128 | 72 |
| 13dA | ---do--- | 1,128 | 72 |
| 14dA | ---do--- | 1,128 | 72 |
| 15dA | Palmitic | 2,048 | 144 |
| 16dA | Myristic | 912 | 72 |
| 17dA | Oleic | 1,128 | 72 |
| 18dA | Palmitic | 1,024 | 72 |
| 19dA | Stearic | 1,136 | 72 |
| 20dA | ---do--- | 1,136 | 72 |
| 21dA | Oleic | 1,128 | 72 |
| 22dA | ---do--- | 1,128 | 72 |
| 23dA | ---do--- | 1,128 | 72 |
| 24dA | ---do--- | 1,128 | 72 |

[1][2] See footnotes at bottom of Table V.

Reference has been made and reference will be continued to be made herein to oxyalkylation procedures. Such procedures are concerned with the use of monoepoxides and principally those available commercially at low cost, such as ethylene oxide, propylene oxide and butylene oxide, octylene oxide, styrene oxide, etc.

Oxyalkylation is well known. For purpose of brevity reference is made to Parts 1 and 2 of U.S. Patent No. 2,792,371, dated May 14, 1957, to Dickson, in which particular attention is directed to the various patents which describe typical oxyalkylation procedure. Furthermore, manufacturers of alkylene oxides furnish extensive information as to the use of oxides. For example, see the technical bulletin entitled "Ethylene Oxide" which has been distributed by the Jefferson Chemical Company, Houston, Texas. Note also the extensive bibliography in this bulletin and the large number of patents which deal with oxyalkylation processes.

The following examples illustrate oxyalkylation.

Example $1aAO_1$

The reaction vessel employed is a 4 liter stainless steel autoclave equipped with the usual devices for heating and heat control, a stirrer, inlet and outlet means, etc., which are conventional in this type of apparatus. The stirrer is operated at a speed of 250 r.p.m. Into the autoclave is charged 1230 grams (1 mole), of 1aA, and 500 grams of xylene. The autoclave is sealed, swept with nitrogen, stirring started immediately, and heat applied. The temperature is allowed to rise to approximately 100° C. at which time the addition of ethylene oxide is started. Ethylene oxide is added continuously at such speed that it is absorbed by the reaction mixture as added. During the addition 132 grams (3 moles) of ethylene oxide is added over 2¼ hours at a temperature of 100° C. to 120° C. and a maximum pressure of 30 p.s.i.

Example $1aAO_2$

The reaction mass of Example 1AO is transferred to a larger autoclave (capacity 15 liters) similarly equipped. Without adding any more xylene the procedure is repeated so as to add another 264 grams (6 moles) of ethylene oxide under substantially the same operating conditions but requiring about 3 hours for the addition.

Example $1aAO_3$

In a third step, another 264 grams (6 moles) of ethylene oxide is added to the product of Example $1aAO_2$. The reaction slows up and requires approximately 6 hours using the same operating temperatures and pressures.

Example $1aAO_4$

At the end of the third step the autoclave is opened and 25 grams of sodium methylate is added, the autoclave is flushed out as before, and the fourth and final oxyalkylation is completed, using 1100 grams (25 moles) of ethylene oxide. The oxyalkylation is completed within 6½ hours, using the same temperature range and pressure as previously.

Example $1aAO_5$

The reaction vessel employed is the same as that used in Example 1aAO. Into the autoclave is charged 1230 g. (1 mole) of 1aA and 500 grams of xylene. The autoclave is sealed, swept with nitrogen, stirring is started immediately, and heat is applied. The temperature is allowed to rise to approximately 100° C. at which time the addition of propylene oxide is started. Propylene oxide is added continuously at such speed that it is absorbed by the reaction mixture as added. During the addition 174 g. (3 moles) of propylene oxide are added over 2½ hours at a temperature of 100 to 120° C. and a maximum pressure of 30 lbs. p.s.i.

Example $1aAO_6$

The reaction mass of Example $1aAO_5$ is transferred to a larger autoclave (capacity 15 liters). The procedure is repeated so as to add another 174 g. (3 moles) of propylene oxide under substantially the same operating conditions but requiring about 3 hours for the addition.

Example $1aAO_7$

At the end of the second step (Example $1aAO_2$) the autoclave is opened, 25 g. of sodium methylate is added, and the autoclave is flushed out as before. Oxyalkylation is continued as before until another 522 g. (9 moles) of propylene oxide are added. 8 hours are required to complete the reaction.

The following examples of oxyalkylation are carried out in the manner of the examples described above. A catalyst is used in the case of oxyethylation after the initial 15 moles of ethylene oxide are added, while in the case of oxypropylation, the catalyst is used after the initial 6 moles of oxide are added. In the case of oxybutylation, oxyoctylation, oxystyrenation, etc. the catalyst is added at the beginning of the operation. In all cases the amount of catalyst is about 1½ percent of the total reactant present. The oxides are added in the order given reading from left to right. The results are presented in the following tables:

TABLE IX.—THE OXYALKYLATED PRODUCTS OF TABLE I

| Example | Grams of oxide added per gram-mole of condensate | | | | |
|---|---|---|---|---|---|
| | EtO | PrO | BuO | Octylene oxide | Styrene oxide |
| 1aO | 132 | 348 | | | |
| 2aO | 132 | 870 | | | |
| 3aO | | | 288 | | |
| 4aO | | 174 | | | |
| 5aO | 660 | | | | |
| 6aO | 440 | 174 | | | |
| 7aO | | 348 | 216 | | |
| 8aO | | 698 | 432 | | |
| 9aO | 880 | | 288 | | |
| 10aO | 1,100 | 348 | | | |
| 12aO | | | | 384 | |
| 17aO | | 1,740 | | | |
| 20aO | 264 | 1,740 | | | |
| 21aO | | | | | 390 |
| 23aO | | 1,740 | 288 | | |
| 25aO | 880 | | 432 | | |
| 28aO | 396 | 698 | | | |

TABLE X.—THE OXYALKYLATED PRODUCTS OF TABLE II

| Example | Grams of oxide added per gram-mole of condensate | | | | |
|---|---|---|---|---|---|
| | EtO | PrO | BuO | Octylene oxide | Styrene oxide |
| 1bO | 264 | | | | |
| 2bO | 396 | | | | |
| 3bO | 132 | 2,030 | | | |
| 4bO | 1,100 | | 216 | | |
| 5bO | 1,320 | | | | |
| 6bO | 1,540 | | 288 | | |
| 7bO | 1,760 | | | | |
| 8bO | 1,980 | | | | |
| 9bO | 396 | 870 | | | |
| 10bO | | 1,160 | 432 | | |
| 12bO | | | | | 130 |
| 16bO | | | | 128 | |
| 18bO | | | 288 | | |
| 21bO | | | | | 260 |
| 25bO | 660 | 1,450 | 288 | | |
| 28bO | | 1,450 | 288 | | |
| 29bO | 440 | 580 | | | |
| 30bO | | | | 128 | |

TABLE XI.—THE OXYALKYLATED PRODUCTS OF TABLE III

| Example | Grams of oxide added per gram-mole of condensate | | | | |
|---|---|---|---|---|---|
| | EtO | PrO | BuO | Octylene oxide | Styrene oxide |
| 1cO | 396 | | | | |
| 2cO | 660 | | | | |
| 3cO | 1,100 | | | | |
| 4cO | 1,320 | | | | |
| 5cO | 2,200 | | | | |
| 6cO | | 552 | | | |
| 7cO | | | | | 230 |
| 8cO | 1,320 | 870 | 216 | | |
| 9cO | 880 | 2,030 | | | |
| 10cO | 660 | | 360 | | |
| 12cO | | | | 256 | |

TABLE XII.—THE OXYALKYLATED PRODUCTS OF TABLE IV

| Example | Grams of oxide added per gram-mole of condensate | | | | |
|---|---|---|---|---|---|
| | EtO | PrO | BuO | Octylene oxide | Styrene oxide |
| 1dO | | | 432 | | |
| 2dO | | 1,450 | | | |
| 3dO | | 2,320 | | | |
| 4dO | 660 | 2,030 | | | |
| 5dO | 1,100 | 174 | | | |
| 6dO | | 1,450 | | | |
| 7dO | | | | | 420 |
| 8dO | | | | 512 | |
| 9dO | | 720 | | | |
| 10dO | 132 | 870 | | | |
| 13dO | 132 | 1,160 | | | |
| 14dO | 264 | 2,030 | | | |
| 15dO | 264 | 2,900 | | | |
| 16dO | 132 | 1,160 | 228 | | |
| 17dO | 1,100 | 698 | 228 | | |
| 18dO | 1,320 | | 720 | | |
| 19dO | | 1,740 | 432 | | |
| 20dO | | 2,320 | | | |
| 21dO | | 2,900 | 228 | | |
| 22dO | 132 | 2,030 | | | |

TABLE XIII.—THE OXYALKYLATED PRODUCTS OF TABLE V

| Example | Grams of oxide added per gram-mole of condensate | | | | |
|---|---|---|---|---|---|
| | EtO | PrO | BuO | Octylene oxide | Styrene oxide |
| 1aAO$_1$ | 132 | | | | |
| 1aAO$_3$ | | | | | 390 |
| 1aAO$_3$ | 660 | | | | |
| 1aAO$_4$ | 1,760 | | | | |
| 1aAO$_5$ | | | 174 | | |
| 1aAO$_7$ | | | 348 | | |
| 1aAO$_7$ | 396 | 522 | | | |
| 2aAO | 264 | | | | |
| 3aAO | | | | 384 | |
| 3aAO | | | | | 390 |
| 4aAO | 1,540 | | | | |
| 5aAO | 1,100 | | | | |
| 6aAO | 1,320 | | | | |
| 7aAO | 1,110 | 870 | | | |
| 8aAO | 1,100 | | 216 | | |
| 9aAO | | 1,450 | | | |
| 10aAO | | 2,030 | | | |
| 17aAO | | 1,450 | | | |
| 20aAO | 264 | 2,320 | | | |
| 23aAO | 264 | | 720 | | |
| 28aAO | 440 | 580 | | | |

TABLE XIV.—THE OXYALKYLATED PRODUCTS OF TABLE VI

| Example | Grams of oxide added per gram-mole of acylated product | | | | |
|---|---|---|---|---|---|
| | EtO | PrO | BuO | Octylene oxide | Styrene oxide |
| 1bAO | 132 | | | | |
| 2bAO | 264 | | | | |
| 3bAO | | | | 256 | |
| 3bA'O | 1,760 | | | | |
| 4bAO | | | | | 420 |
| 5bAO | 880 | 870 | | | |
| 6bAO | 880 | | 288 | | |
| 7bAO | 660 | 2,030 | | | |
| 8bAO | 660 | | 720 | | |
| 9bAO | 880 | 2,320 | | | |
| 10bAO | 880 | 1,450 | 432 | | |
| 14bAO | 1,760 | 1,450 | 216 | | |
| 28bAO | 440 | 580 | | | |
| 29bAO | | 522 | 216 | | |
| 30bAO | 440 | | 360 | | |

TABLE XV.—THE OXYALKYLATED PRODUCTS OF TABLE VI

| Example | Grams of oxide added per gram-mole of acylated product | | | | |
|---|---|---|---|---|---|
| | EtO | PrO | BuO | Octylene oxide | Styrene oxide |
| 1cAO | 132 | | | | |
| 2cAO | | | | | 390 |
| 3cAO | 880 | | | | |
| 4cAO | 1,320 | | | | |
| 5cAO | 220 | | | | |
| 6cAO | | | | 256 | |
| 7cAO | | | 216 | | |
| 8cAO | | 348 | | | |
| 9cAO | | | 432 | | |
| 10cAO | 880 | 870 | | | |
| 11cAO | 880 | 870 | 216 | | |
| 12cAO | 1,320 | | 288 | | |

TABLE XVI.—THE OXYALKYLATED PRODUCTS OF TABLE VII

| Example | Grams of oxide added per gram-mole of acylated product | | | | |
|---|---|---|---|---|---|
| | EtO | PrO | BuO | Octylene oxide | Styrene oxide |
| 1dAO | 132 | | | | |
| 2dAO | | | | 512 | |
| 3dAO | | 174 | | | |
| 4dAO | | | 216 | | |
| 5dAO | | | | | 520 |
| 6dAO | | | 432 | | |
| 7dAO | 660 | | | | |
| 8dAO | 1,100 | | | | |
| 9dAO | 1,760 | | | | |
| 10dAO | 1,980 | | | | |
| 13dAO | 660 | 580 | | | |
| 14dAO | 660 | 1,450 | | | |
| 15dAO | 660 | 1,740 | 288 | | |
| 16dAO | 1,100 | 2,320 | 432 | | |
| 17dAO | | 870 | 216 | | |
| 18dAO | | 1,450 | 216 | | |
| 19dAO | | 1,740 | 432 | | |
| 20dAO | | 2,610 | | | |
| 21dAO | | 2,900 | | | |
| 22dAO | | 3,190 | | | |

Since the oxyalkylated, and the acylated and oxyalkylated products have terminal hydroxy groups, they can be acylated. This step is carried out in the manner previously described for acylation. These examples are illustrative and not limiting.

*Example 1aOA*

One mole (919 grams) of 1aO mixed with 846 grams (three moles) of oleic acid and 300 ml. xylene. The reaction mixture is heated to about 150–160° C. over a period of 2 hours until 54 grams (3 moles) of water are removed. Xylene is then removed under vacuum. The product 1aOA is xylene soluble.

*Example 1aAOA*

The process of the immediately previous example is repeated using 1aAO. The product 1aAOA is xylene soluble.

Additional examples are presented in the following tables. All of the products are dark, viscous liquids.

TABLE XVII.—THE ACYLATED PRODUCTS OF TABLES IX, X, XI, XII

| Example | Acid | Grams of acid per gram-mole of oxyalkylated product | Grams water removed |
|---|---|---|---|
| 1aOA | Oleic | 282 | 18 |
| 2aOA | do | 282 | 18 |
| 3aOA | do | 282 | 18 |
| 4aOA | Stearic | 284 | 18 |
| 28aOA | do | 284 | 18 |
| 1bOA | Myristic | 228 | 18 |
| 2bOA | Stearic | 284 | 18 |
| 3bOA | Oleic | 282 | 18 |
| 4bOA | do | 282 | 18 |
| 28bOA | Stearic | 284 | 18 |
| 29bOA | Oleic | 282 | 18 |
| 30bOA | Lauric | 200 | 18 |
| 1cOA | Oleic | 282 | 18 |
| 2cOA | do | 282 | 18 |
| 3cOA | do | 282 | 18 |
| 4cOA | Stearic | 284 | 18 |
| 1dOA | Oleic | 564 | 36 |
| 2dOA | Stearic | 568 | 36 |
| 3dOA | Oleic | 564 | 36 |
| 4dOA | do | 564 | 36 |

TABLE XVIII.—THE ACYLATED PRODUCTS OF TABLES XIII, XIV, XV, XVI

| Example | Acid | Grams of acid per gram-mole of oxyalkylated product | Grams water removed |
|---|---|---|---|
| 1aAOA | Oleic | 282 | 18 |
| 2aAOA | Stearic | 284 | 18 |
| 3aAOA | Oleic | 282 | 18 |
| 4aAOA | Stearic | 284 | 18 |
| 28aAOA | Lauric | 200 | 18 |
| 1bAOA | Oleic | 282 | 18 |
| 2bAOA | do | 282 | 18 |
| 3bAOA | Stearic | 284 | 18 |
| 4bAOA | Oleic | 282 | 18 |
| 28bAOA | Stearic | 284 | 18 |
| 29bAOA | Oleic | 564 | 36 |
| 30bAOA | do | 282 | 18 |
| 1cAOA | Myristic | 228 | 18 |
| 2cAOA | Lauric | 200 | 18 |
| 3cAOA | Oleic | 282 | 18 |
| 4cAOA | do | 282 | 18 |
| 1dAOA | Stearic | 568 | 36 |
| 2dAOA | do | 568 | 36 |
| 3dAOA | Oleic | 564 | 36 |
| 4dAOA | do | 564 | 36 |

USE IN EMULSION FLUIDS FOR DRILLING WELLS

This phase of the invention relates to the use of the aforementioned compounds in producing an improved drilling fluid useful in drilling oil and gas wells.

Fluids commonly used for the drilling of oil and gas wells are of two general types: water-base drilling fluids comprising, for example, a clay suspended in water, and oil-base drilling fluids comprising, for example, a clay or calcium carbonate suspended in mineral oil.

A third type of drilling fluid, which has recently been developed, is one of oil-in-water or water-in-oil emulsions, for example, emulsions of mineral oil in water or water in mineral oil formed by means of emulsifiers such as: sulfuric acid; Turkey-red oil; soaps of fatty acids, for example, sodium oleate; emulsoid colloids, for example starch, sodium alginate, etc. Varying amounts of finely-divided clay, silica, calcium carbonate, blown asphalt, and other materials may be added to these emulsions to improve their properties and control their weight.

The use of drilling emulsions has several advantages over the use of either water-base or oil-base drilling fluids.

Drilling emulsions are generally superior to water-base drilling fluids in forming a very thin and substanially fluid-impervious mudsheath on the walls of a borehole, in eliminating fluid loss to the formation and contamination of producing formations by an aqueous liquid, etc.

Drilling emulsions are generally superior to oil-base drilling fluids from the point of view of cost, of ease of handling, of suitability for electrical logging, etc.

The disadvantage for general use of drilling emulsions is, however, their lack of stability in the presence of even moderately high concentrations of electrolytes such as brines entering the borehole from the formation and becoming admixed to the drilling fluid.

Thus, drilling emulsions, formed by means of the emulsifiers listed above break down immediately or after a few hours of use or storage upon contamination with small concentrations of electrolytes, such as, for example, a 1% solution of sodium chloride. However, the present compounds provide an improved oil and water drilling emulsion or fluid which is substantially stable in the presence of contaminating formation salts or brines.

This phase of the present invention relates to drilling fluids of improved characteristics prepared by forming emulsions comprising oil, water, the compounds of this invention and, if desired various amounts of finely-divided clay, silica, calcium carbonate, and other materials to control the properties or weight of the drilling fluid.

Of the two general types of oil and water emulsion, i.e., oil-in-water and water-in-oil emulsions, the present invention is primarily concerned with oil-in-water emulsions where the oil is present in the dispersed phase while the water forms the continuous phase.

Various methods may be selectively used in forming well drilling emulsions by means of the agents of the present invention.

If it is desired to prepare a very light or low specific gravity drilling emulsion, a mineral oil, such as crude oil, gas oil, diesel oil, etc., is emulsified directly in water by means of a high speed hopper or a jet device, such as a so-called mud-gun, in the presence of a relatively small quantity, such as from 0.5 to 5% by weight or higher but preferably 3 to 3% by weight, based on the weight of oil plus water, of the compounds of this invention. Depending on the specific gravity of the mineral oil, which should preferably be of a range from 10 to 40° A.P.I., and on the particular specific gravity of the drilling emulsion which is thus desired to obtain for a particular purpose, for example, for drilling through low pressure formations, the proportion in which oil is emulsified in water can be varied within fairly wide limits, although a ratio of about 25 to 50% by volume of the mineral oil to about 75 to 50% of water has been found to give especially favorable results.

Although in the above instances the present emulsions include only the three components described, that is, water, mineral oil and the emulsifying agent, various other components may be added thereto, if desired, for the purpose of controlling specific properties of the emulsions.

Thus, if it is desired to improve their plastering properties and thus to minimize the so-called filtering losses of the fluid to the formation, a blown asphalt can be added to the emulsion, and preferably to the mineral oil prior to emulsification, in relatively small quantities such as from 5 to 15% on the weight of the mineral oil, as described in Patent No. 2,223,027.

If it is desired to give a greater consistency to the present emulsions and to increase their capacity for carrying drill cuttings, a finely-divided solid and preferably a colloidal material can be admixed with the emulsions, preferably during the emulsification process, to form a stable three-phase emulsion. Thus bentonite may be added in amounts of from 1 to 5% by weight, or ordinary drilling clay in amounts from 1 to 40% by weight on the total weight of the emulsion.

Furthermore, the weight or specific gravity of the present emulsions can be accurately controlled by adding thereto, in a suitably comminuted form, any desired weighting material such as calcium carbonate, barytes, iron oxide, galena, etc. These materials have been found to remain stably suspended in the present emulsions while maintaining the specific gravity thereof within any desired range, such as from 67 to 120 lbs. per cubic foot.

Since the present emulsions are used on drilling installations wherein a drilling fluid of either the water-base or the oil-base type is usually already available, it has been found advantageous to apply the emulsifying agents of the present invention in forming drilling emulsions with these drilling fluids as starting material.

Thus, a water-base drilling fluid comprising water and clay and having a weight such, for example, as 86 lbs. per cubic foot, can be mixed with approximately 25 to 50% by volume of a heavy crude oil with the addition of 2.0 to 3.0% (calculated on the weight of the total mixture) of the instant compounds to give a stable emulsion having a weight of approximately 82 to 72 lbs. per cubic foot.

Likewise, an oil-base drilling fluid comprising, for example, crude oil or a diesel oil and calcium carbonate suspended therein by means of agents such as tall oil and sodium silicate or hydroxide, as described in Patent No. 2,350,154 and having a weight such, for example, as 78 lbs. per cubic foot, may be mixed with approximately from one to three times its volume of water and emulsified therewith with the addition of the instant compounds to give a stable emulsion having a weight of approximately 70 to 66 lbs. per cubic foot.

In this connection, it is especially important to note that the emulsifying action of the present compounds is not in any way impaired by the chemical compounds which are ordinarily used in controlling the viscosity, stability or other properties of such water-base or oil-base drilling fluids.

The drilling emulsions formed in the ways described hereinabove have the following advantages over water-base and oil base drilling fluids; (1) they are considerably less expensive than oil-base drilling fluids so that drilling costs are greatly decreased; (2) their plastering properties are much superior to those of water-base drilling fluids and compare favorably with those of oil-base drilling fluids so that filtering losses to the formation are greatly minimized; (3) they are better adapted than oil-base drilling fluids for surveying wells by electrical logging methods; (4) greater drilling speeds can in general be realized with the drilling emulsions of the present type than with either water-base or oil-base drilling fluids.

The following examples are presented to illustrate the present invention.

*Example*

Drilling emulsions are prepared by emulsifying a Ventura clay water base drilling fluid, treated with a 0.3% by weight of sodium hexametaphosphate and weighing about 75 lbs. per cubic foot, with stove oil in the weight ratio of 75% Ventura drilling fluid, 22% Stove Oil and 3% emulsifier. The emulsifiers employed in producing these emulsions are shown in the following table. These emulsions are useful as drilling fluids.

DRILLING FLUID ADDITIVES

| Ex. No. | I | | Weight of oxides added to I (grams) |
|---|---|---|---|
| | Reactants (grams) | $H_2O$ eliminated (grams) | |
| 17-1 | 1a(439)+lauric acid (600) | 54 | None. |
| 17-2 | 1a(439)+lauric acid (600) | 72 | Do. |
| 17-3 | 2a(568)+lauric acid (600) | 54 | Do. |
| 17-4 | 2a(568)+lauric acid (600) | 72 | Do. |
| 17-5 | 2a (568)+oleic acid (846) | 54 | EtO (264). |
| 17-6 | 2a (568)+oleic acid (846) | 72 | None. |
| 17-7 | 1b (492)+stearic acid (568) | 36 | Do. |
| 17-8 | 1b (492)+stearic acid (568) | 36 | EtO (132). |
| 17-9 | 1c (645)+lauric acid (600) | 54 | EtO (440). |
| 17-10 | 1c (645)+lauric acid (600) | 72 | None. |
| 17-11 | 2d (832)+oleic acid (1128) | 72 | Do. |
| 17-12 | 2d (832)+oleic acid (1128) | 72 | EtO (440). |
| 17-13 | 4d (772)+oleic acid (1128) | 72 | None. |
| 17-14 | 13d (688)+lauric acid (800) | 72 | Do. |
| 17-15 | 16d (800)+lauric acid (800) | 72 | Do. |

DRILLING FLUID ADDITIVES—Continued

| Ex. No. | I | | Weight of oxides added to I in alphabetical order (grams) |
|---|---|---|---|
| | Reactants (grams) | $H_2O$ eliminated (grams) | |
| 17–16 | 28a (1960) | | (A) PrO (580). |
| 17–17 | 28a (1960)+lauric acid (600). | 120 | (A) PrO (116). (B) EtO (1320). |
| 17–18 | 28aO (3054)+stearic acid (284). | 18 | |
| 17–19 | 28aAOA | | |
| 17–20 | 28b (1400) | | EtO (1980). |
| 17–21 | 28b (1400)+oleic acid (564). | 40 | EtO (2640). |
| 17–22 | 28bAOA | | |
| 17–23 | 29b(1635) | | (A) PrO (522). (B) EtO (1980). |
| 17–24 | 29b (1635)+oleic acid (282). | 18 | EtO (1320). |
| 17–25 | 29bO (2655)+oleic acid (282). | 18 | |
| 17–26 | 29bAOA | | |
| 17–27 | 30b (1580) | | EtO (2200). |
| 17–28 | 30b (1580)+stearic acid (569). | 40 | |
| 17–29 | 30b (1580)+stearic acid (569). | 40 | (A) PrO (464). (B) EtO (1320). |
| 17–30 | 30bAOA | | |

We claim:

1. A drilling fluid for wells containing an emulsion of water and oil, a finely divided solid weighting material dispersed in said emulsion, and a minor amount of a member selected from the group consisting of:
(1) acylated, (2) oxyalkylated, (3) acylated then oxyalkylated, (4) oxyalkylated then acylated, (5) acylated, then oxyalkylated and then acylated, monomeric polyaminomethyl phenols characterized by reacting a preformed methylol phenol having one to four methylol groups in the 2, 4, 6 position with a polyamine containing at least one secondary amine group in amounts of at least one mole of secondary polyamine per equivalent of methylol group on the phenol until one mole of water per equivalent of methylol group is removed, in the absence of an extraneous catalyst; and then reacting the thus formed monomeric polyaminomethyl phenol with a member selected from the group consisting of (1) an acylation agent, (2) an oxyalkylation agent, (3) an acylation then an oxyalkylation agent, (4) an oxyalkylation then an acylation agent, and (5) an acylation then an oxyalkylation and then an acylation agent, the preformed methylol phenol having only functional groups selected from the class consisting of methylol groups and phenolic groups, the polyamine having only functional groups selected from the class consisting of primary amino groups, secondary amino groups and hydroxyl groups, the acylation agent having up to 40 carbon atoms and being selected from the class consisting of unsubstituted carboxylic acids, unsubstituted hydroxy carboxylic acids, unsubstituted acylated hydroxy carboxylic acids, lower alkanol esters of unsubstituted carboxylic acids, glycerides of unsubstituted carboxylic acids, unsubstituted carboxylic acid chlorides and unsubstituted carboxylic acid anhydrides, and the oxyalkylation agent being selected from the class consisting of alpha-beta alkylene oxides and styrene oxide.

2. The drilling fluid of claim 1 where the preformed methylol phenol has all available ortho and para positions substituted with methylol groups.

3. The drilling fluid of claim 1 where the preformed methylol phenol is 2,4,6-trimethylol phenol.

4. The drilling fluid of claim 1 where the polyamine is an aliphatic polyamine.

5. The drilling fluid of claim 1 where the polyamine is a polyalkylene polyamine.

6. The drilling fluid of claim 1 where the acylation agent is a monocarboxy acid having 7 to 39 carbon atoms.

7. The drilling fluid of claim 1 where the oxyalkylation agent is at least one 1,2-alkylene oxide.

8. The drilling fluid of claim 1 where the preformed methylol phenol is 2,4,6-trimethylol phenol, the polyamine is a polyalkylene polyamine, the acylation agent is a monocarboxy acid having 7 to 39 carbon atoms, and the oxyalkylation agent is at least one 1,2-alkylene oxide having 2 to 4 carbon atoms.

9. The drilling fluid of claim 1 where the member is an acylated monomeric polyaminomethyl phenol.

10. The drilling fluid of claim 1 where the member is an acylated then oxyalkylated monomeric polyaminomethyl phenol.

11. The drilling fluid of claim 9 where the preformed methylol phenol is 2,4,6-trimethylol phenol, the polyamine is a polyalkylene polyamine, and the acylation agent is a monocarboxy acid having 7 to 39 carbon atoms.

12. The drilling fluid of claim 10 where the preformed methylol phenol is 2,4,6-trimethylol phenol, the polyamine is a polyalkylene polyamine, the acylation agent is a monocarboxy acid having 7 to 39 carbon atoms, and the oxyalkylation agent is at least one 1,2-alkylene oxide having 2 to 4 carbon atoms.

13. The drilling fluid of claim 11 where the preformed methylol phenol is 2,4,6-trimethylol phenol, the polyamine is diethylene triamine, and the acylation agent is lauric acid.

14. The drilling fluid of claim 11 where the preformed methylol phenol is 2,4,6-trimethylol phenol, the polyamine is triethylene tetramine, and the acylation agent is oleic acid.

15. The drilling fluid of claim 11 where the preformed methylol phenol is 2,4,6-trimethylol phenol, the polyamine is triethylene tetramine, and the acylation agent is lauric acid.

16. The drilling fluid of claim 12 where the preformed methylol phenol is 2,4,6-trimethylol phenol, the polyamine is triethylene tetramine, the acylation agent is oleic acid, and the oxyalkylation agent is ethylene oxide.

References Cited in the file of this patent

UNITED STATES PATENTS

| 2,661,334 | Lummus | Dec. 1, 1953 |
| 2,907,791 | Schmitz et al. | Oct. 6, 1959 |
| 2,946,759 | Gallant et al. | July 26, 1960 |
| 2,998,452 | Bruson et al. | Aug. 29, 1961 |

OTHER REFERENCES

Burdyn et al.: That New Drilling Fluid for Hot Holes, article in the Oil and Gas Journal, September 10, 1956, pages 104–107.